United States Patent [19]
Beckingham et al.

[11] Patent Number: 6,076,266
[45] Date of Patent: Jun. 20, 2000

[54] THEODOLITE WITH A DISENGAGEABLE ADJUSTMENT MECHANISM

[75] Inventors: Michael Beckingham, Aukland, New Zealand; Michael C. Detro, Los Gatos, Calif.

[73] Assignee: Trimble Navigation Limited, Sunnyvale, Calif.

[21] Appl. No.: 09/160,387

[22] Filed: Sep. 24, 1998

Related U.S. Application Data

[63] Continuation-in-part of application No. 08/959,075, Oct. 28, 1997, Pat. No. 5,887,353, which is a continuation of application No. 08/612,167, Mar. 7, 1996, Pat. No. 5,689,892, and a continuation-in-part of application No. 08/979,186, Nov. 26, 1997, abandoned.

[51] Int. Cl.⁷ ................................. G01C 1/02; F16H 1/16
[52] U.S. Cl. .............................. 33/292; 33/285; 33/1 N; 33/281; 74/10.85; 74/398; 74/425
[58] Field of Search ........................ 33/292, 1 M, 1 N, 33/1 PT, 281, 282, 285, 286, 290, 293; 74/425, 89.14, 490.12, 10.85, 553, 398

[56] References Cited

U.S. PATENT DOCUMENTS

| | | | |
|---|---|---|---|
| 854,999 | 5/1907 | Grauhering | 74/398 |
| 1,518,473 | 12/1924 | Whaler | 74/10.85 |
| 2,667,693 | 2/1954 | Baker | 33/292 |
| 4,084,327 | 4/1978 | Kooi | 33/281 |
| 4,752,126 | 6/1988 | Fujii | 33/285 |
| 5,689,892 | 11/1997 | Beckingham | 33/292 |
| 5,887,353 | 3/1999 | Beckingham | 33/292 |

*Primary Examiner*—Christopher W. Fulton
*Attorney, Agent, or Firm*—Blakely, Sokoloff, Taylor & Zafman LLP

[57] ABSTRACT

A theodolite that includes a stand, a telescope, a friction gear and a worm gear. The telescope is pivotally secured to the stand. The clutch plate is secured to the telescope for at least limited rotational movement upon pivoting of the telescope. The friction gear is mounted for rotation about substantially the same axis as rotation of the clutch plate. The worm gear is mounted to the stand and is in constant mesh with the friction gear so that rotation of the worm gear causes rotation of the friction gear. A device engages the friction gear with the clutch plate with a frictional force. The frictional force is adjustable to allow for adjustment of the telescope separately from the worm gear.

14 Claims, 9 Drawing Sheets

THEODOLITE WITH A DISENGAGEABLE ADJUSTMENT MECHANISM

This Patent Application is a Continuation-In-Part of U.S. patent application Ser. No. 08/959,075 filed Oct. 28, 1997 now U.S. Pat. No. 5,887,353 which is a Continuation Application of U.S. patent application Ser. No. 08/612,167 filed Mar. 7, 1996 now U.S. Pat. No. 5,689,982. This Patent Application is also a Continuation-In-Part of U.S. patent application Ser. No. 08/979,186 filed Nov. 26, 1997 now abandonded.

BACKGROUND OF THE INVENTION

1). Field of the Invention

The present invention relates to an adjustment mechanism for moving the telescope of a theodolite.

2). Description of Related Art

Prior art theodolites and total stations typically contain a mechanism to provide coarse and fine movement of the telescope and locking mechanism that locks the telescope in position so that the coarse and fine mechanism can be used to move the telescope. Prior art theodolites and total stations have two separate knobs on both the vertical and horizontal mechanisms that lock and move the telescope in a vertical and horizontal direction. The locking mechanism locks a lever on the axis of the telescope and the coarse and fine mechanisms operate against the end of this lever to move the telescope. The reverse direction of the lever is typically achieved by a leaf or coil spring.

The problem with prior art mechanisms is that the operator must continuously unlock and re-lock the locking mechanism in order to return the coarse and fine mechanism to the center of the run as the lateral movement is limited by the spring that acts against mechanism. This is a great inconvenience to the operator as it takes up valuable time and it makes it almost impossible to track a moving target. It would be desirable to provide a theodolite or total station with a continuous coarse and fine adjusting mechanism for each of the vertical and horizontal alignment of the telescope. Additionally, it would be desirable if each mechanism have only one knob that would continuously move the telescope.

SUMMARY OF THE INVENTION

A telescope is pointed with a constant mesh worm and gear assembly. Free motion for ultra coarse alignment is provided by disengaging the gear assembly from the rest of the rotating assembly by relieving pressure on a clutch plate that usually grips the gear. The friction level in the normally engaged mode is adjustable by adjusting the pressure applied to the clutch plates. When the clutch is released the rotating assembly rotates with negligible friction. This facilitates rapid positioning and then instant restoration of precise position adjustment by re-engagement of the clutch plate.

According to one aspect of the invention there is provided a theodolite that includes a stand, a telescope, a friction gear and a worm gear. The telescope is pivotally secured to the stand. The clutch plate is secured to the telescope for at least limited rotational movement upon pivoting of the telescope. The friction gear is mounted for rotation about substantially the same axis as rotation of the clutch plate. The worm gear is mounted to the stand and is in constant mesh with the friction gear so that rotation of the worm gear causes rotation of the friction gear. A device engages the friction gear with the clutch plate with a frictional force. The frictional force is adjustable to allow for adjustment of the telescope separately from the motion provided by rotation of the worm gear.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

A theodolite is described which has an alidade which is rotatable in a horizontal plane relative to a stand, and a telescope which is rotatable in a vertical plane relative to the alidade. A geared adjuster is provided which can move the alidade and another geared adjuster which can move the telescope. A clutch plate couples and decouples each gear adjusted with a frictional force. By coupling and decoupling the geared adjusters utilizing the clutch plates, less undesirable angular displacement of the telescope occurs during coupling to the geared adjusters.

Referring to the drawings more particularly by reference numbers, FIGS. 1–4 show a theodolite 10 according to one embodiment of the present invention. A theodolite 10 is a survey instrument that precisely measures vertical and horizontal angles. The theodolite 10 has a telescope 12 that is attached to a pivot pin 14. The pivot pin 14 is coupled to a base plate 16 that is mounted to a tripod stand 18 in elevation angle. The pivot pin 14 is also attached to a friction gear 20.

Figure 1:
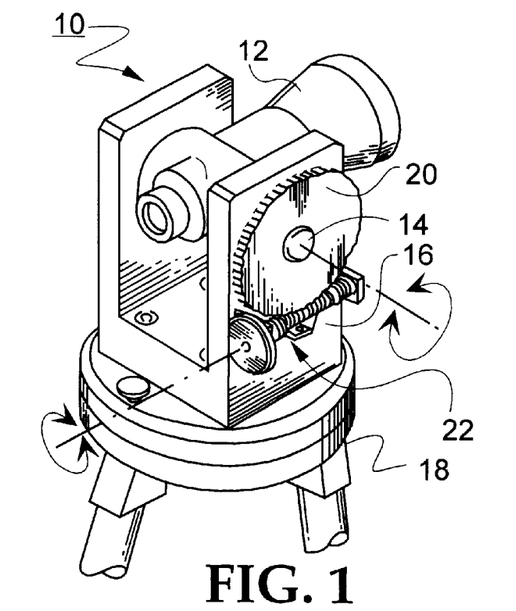
FIG. 1 is a perspective view of a theodolite according to one embodiment of the present invention.
Figure 2:
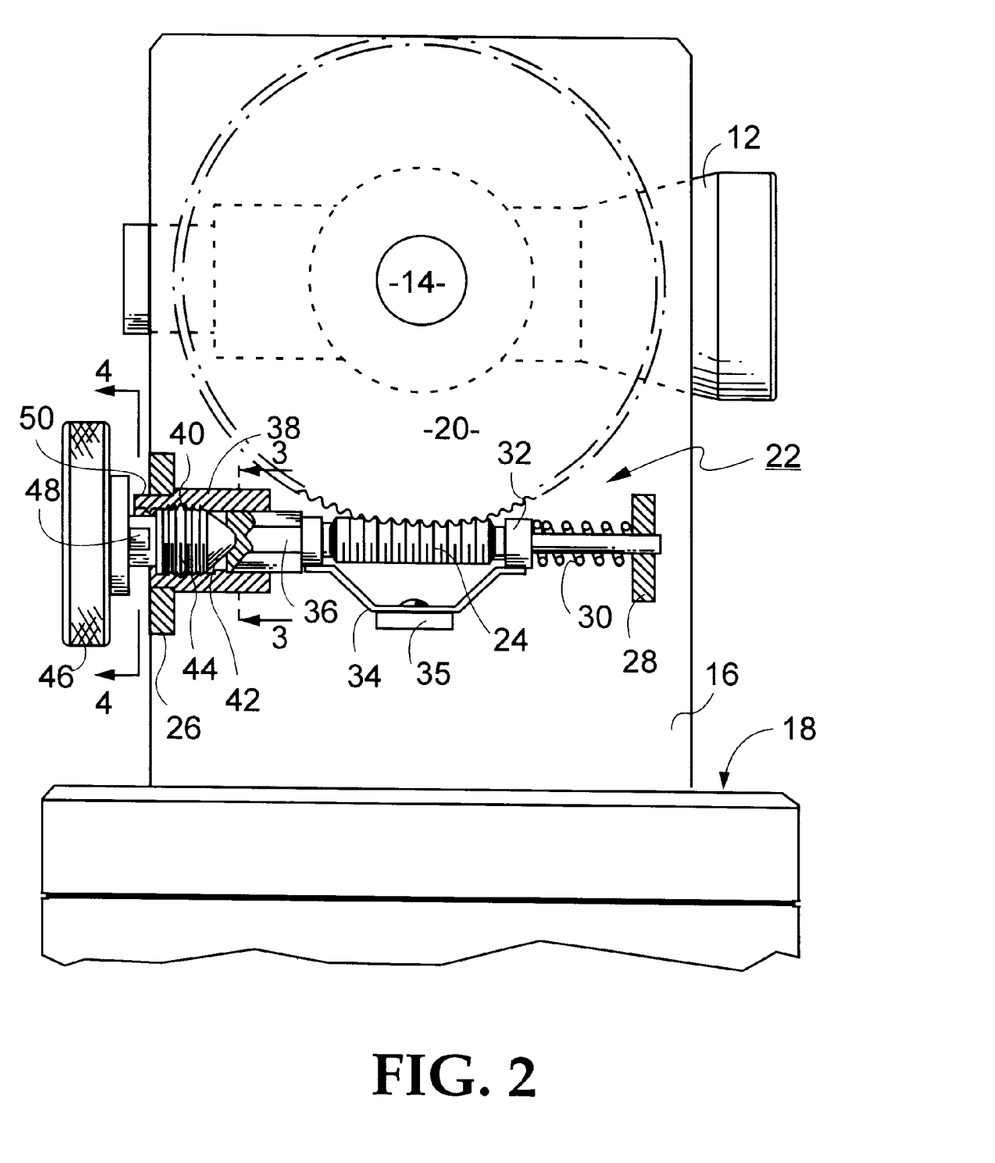
FIG. 2 is a side cross-sectional view of an adjustment mechanism of the theodolite.

The friction gear 20 is rotated by an adjustment mechanism 22. Rotation of the friction gear 20 will induce a corresponding rotational movement of the telescope 12 relative to the base plate 16 and tripod stand 18. The friction gear 20 provides a vertical movement of the telescope 12 so that the operator can align markings (not shown) in the scope with a marker (not shown). Although a vertical adjustment mechanism is shown and described, it is to be understood that a second horizontal mechanism 22 can also be used to move the telescope 12 in a horizontal direction.

As shown in FIG. 2, the adjustment mechanism 22 includes a worm gear 24 that is coupled to the friction gear 20. The worm gear 24 is supported by a pair of brackets 26 and 28 that are mounted to the base plate 16. The brackets 26 allow the worm gear 24 to rotate and translate relative to the base plate 16. The mechanism 22 includes a first spring 30 located between the bracket 28 and a collar 32 of the worm gear 24. The first spring 30 exerts a biasing force on the worm gear 24 along the longitudinal axis of the gear 24. The mechanism 22 may also contain a second spring 34 that is supported by bracket 35, and exerts a biasing force on the worm gear 24 that is essentially perpendicular to the longitudinal axis of the gear 24. The second spring 34 pushes the worm gear 24 into the friction gear 20 to insure engagement between the gears.

Figure 3:
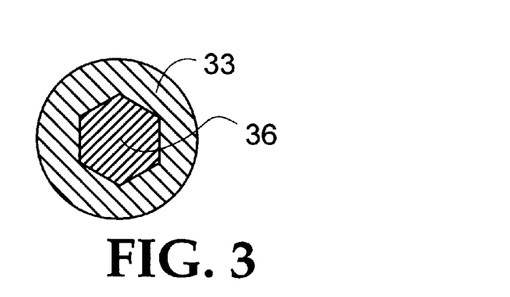
FIG. 3 is a cross-sectional view taken at line 3—3 of FIG. 2.

As shown in FIG. 3, the worm gear 24 has a hexagonally shaped end 36 that resides within a corresponding hexagonally shaped opening of an outer sleeve 38. The corresponding hexagonal features allow the worm gear 24 to move in a linear manner relative to the outer sleeve 38 while inducing a rotational movement of the gear 24 when the sleeve 38 is rotated.

Referring to FIG. 2, the outer sleeve 38 has internal threads 40 that cooperate with corresponding external threads 42 of a lead screw 44 so that the screw 44 can rotate relative to the sleeve 38. The end of the lead screw 44 engages and pushes the worm gear 24 when the screw 44 is rotated into the sleeve 38. The transitional movement of the worm gear 24 will induce a rotation of the friction gear 20 and a corresponding movement of the telescope 12. The threads 40 and 42 of the outer sleeve 38 and linear screw 44 have a relative high number of threads per inch so that a large rotation of the screw 44 will only induce a small translation of the worm gear 24. In the preferred embodiment, the worm gear 24 will translate 0.3 mm for each full revolution (360°) of the screw 44. The linear movement of the worm gear 24 provides a fine control of the telescope 12.

Figure 4:
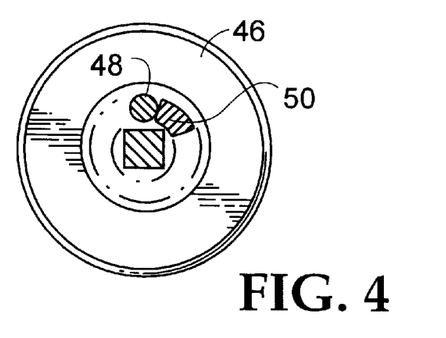
FIG. 4 is a cross-sectional view taken at line 4—4 of FIG. 2.

As shown in FIGS. 2 and 4, the linear screw 44 is attached to a knob 46. The knob 46 has a stop 48 that can engage an arm 50 of the outer sleeve 38 to move the sleeve 38 and rotate the worm gear 24. The rotation of the sleeve 38 and worm gear 24 provide a coarse movement of the telescope 12. In the preferred embodiment, the friction gear 20 will rotate 1.45° for each full revolution of the knob 46.

Figure 5:
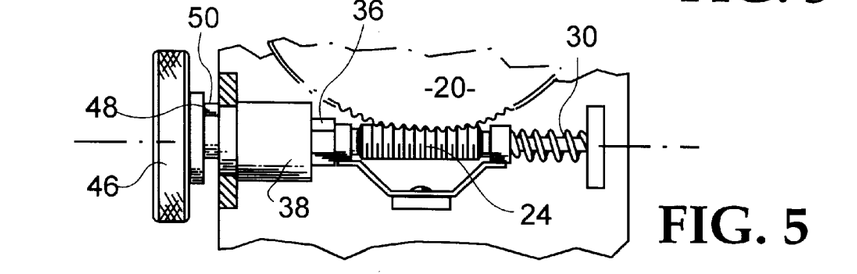
FIG. 5 is a side view of the adjustment mechanism showing a stop engaging an outer sleeve to induce a coarse movement of a telescope.

As shown in FIG. 5, in operation, the operator can adjust the theodolite 10 by turning the knob 46 until the stop 48 engages the arm 50 of the outer sleeve 38. Further rotation of the knob 46 will turn the sleeve 38 and rotate the worm gear 24. Rotation of the worm gear 24 turns the friction gear 20 and moves the telescope 12. The rotation of the sleeve 38 will provide a coarse adjustment of the telescope.

Figure 6:
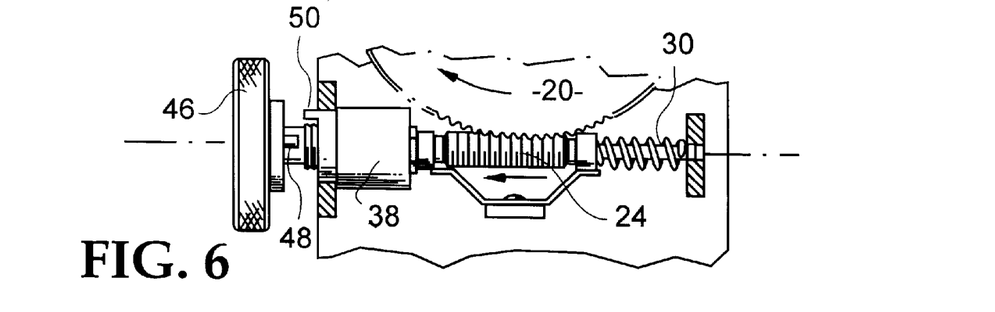
FIG. 6 is a side view similar to FIG. 5 showing the stop disengaged from the outer sleeve and a linear screw pushing a worm gear to induce a fine movement of the telescope.

As shown in FIG. 6, the operator can finely adjust the telescope 12 by rotating the knob 46 in the opposite direction. The opposite rotational movement of the knob 46 separates the stop 48 from the arm 50 and allows the linear screw 44 to screw into or out of the sleeve 38. If the linear screw 44 is screwed into the sleeve 38 the end of the screw 44 will push the worm gear 24 and rotate the friction gear 20. If the linear screw 44 is screwed out of the sleeve 38 the first spring 30 will push the worm gear 24 and rotate the friction gear 20. The operator can manipulate the knob 46 until the telescope 12 is properly aligned. The present invention provides a theodolite adjustment mechanism which allows the operator to coarsely and finely move a telescope with a single knob.

Figures 7, 10A, 10B:
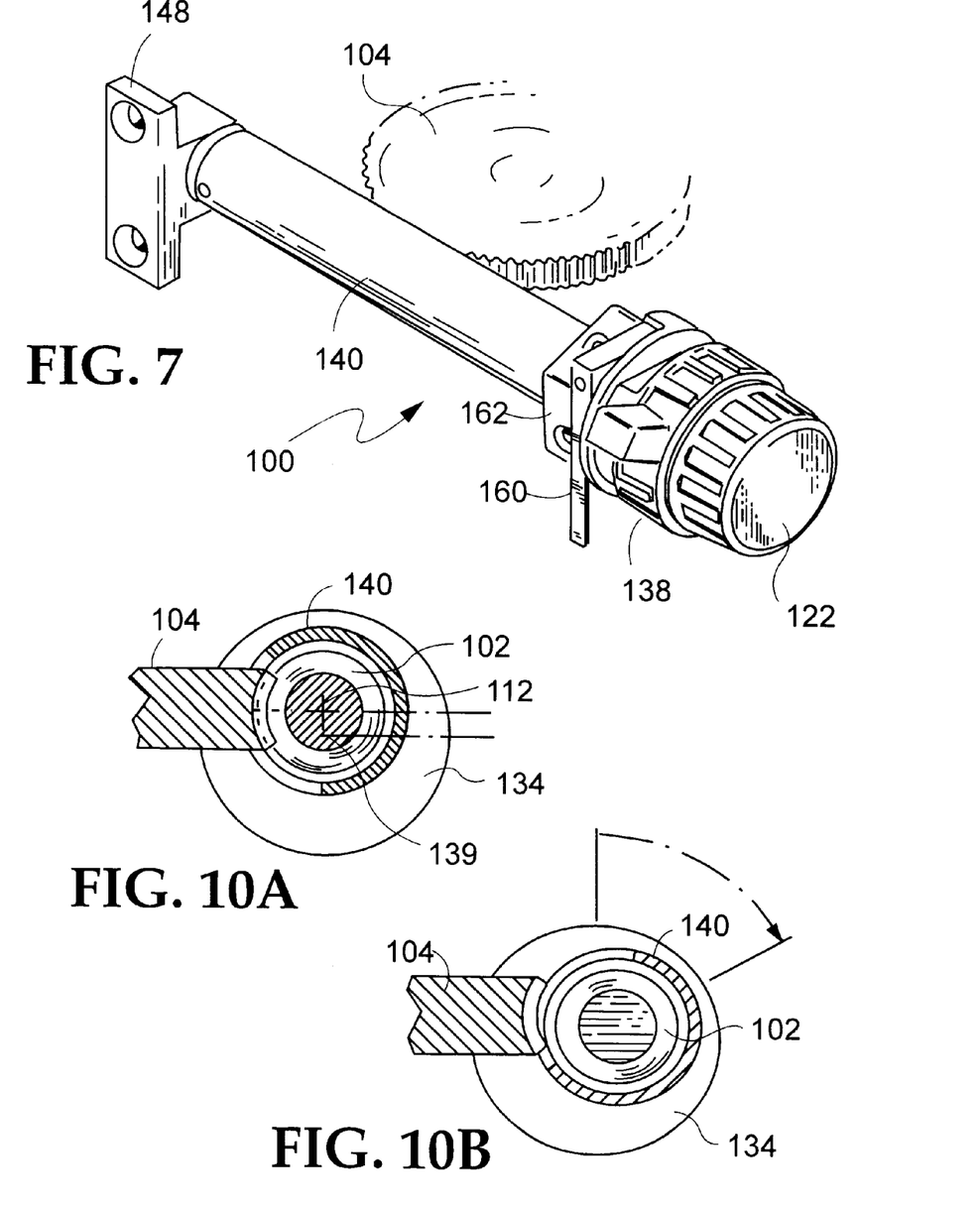
FIG. 7 is a perspective view of one alternate embodiment of an adjustment mechanism.
FIG. 10a is a sectional view showing a cam and a worm gear shaft in an engaged position.
FIG. 10b is a sectional view showing the cam and the worm gear in a disengaged position.
Figures 8, 9:
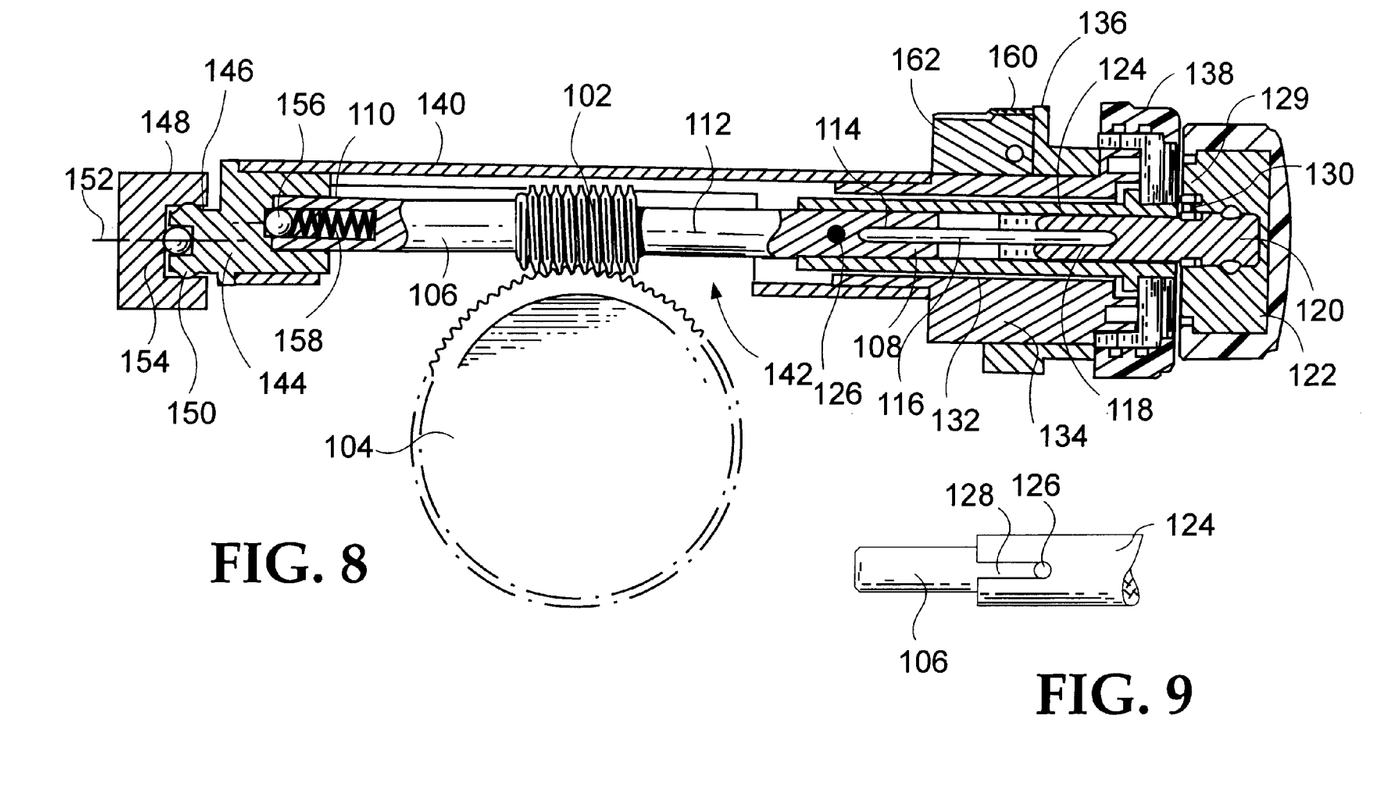
FIG. 8 is a cross-sectional view of the adjustment mechanism of FIG. 7.
FIG. 9 is an enlarged view showing a pin that couples a worm shaft to a fine adjustment sleeve.

FIGS. 7 and 8 show one alternate embodiment of an adjustment mechanism 100. The mechanism 100 includes a worm gear 102 that may engage a friction gear 104 of a telescope (not shown). Rotation of the worm gear 102 induces a corresponding rotation of the friction gear 104. The worm gear 102 may be formed on a shaft 106 which has a first end 108 and a second end 110. The worm gear 102 and shaft 106 rotated about a spin axis 112.

The first end 108 of the shaft 106 has a bore 114 that receives a fine adjustment pin 116. The pin 116 is also coupled to a bore 118 of a fine adjust screw 120 that is rigidly attached to a knob 122. The screw 120 is coupled to a threaded fine adjustment sleeve 124. Rotation of the knob 122 turns the screw 120 and causes the pin 116 to push the worm gear 102. Movement of the worm gear 102 induces a rotation of the friction gear 104.

As shown in FIG. 9 the mechanism includes a pin 126 that is attached to the worm shaft 106 and extends into a slot 128 of the sleeve 124. Referring to FIG. 8, the knob 122 has a stop 129 that engages an arm 130 of the fine adjustment sleeve 124. The sleeve 124 will turn with the knob 122 when the stop 129 engages the arm 130. The sleeve 124 pushes the pin 126 and rotates the worm gear 102. The knob 122 can be counter-rotated to disengage the stop 129 from the arm 130 so that the fine adjustment pin 116 can be actuated.

The collar 124, pin 116, shaft 106 and screw 120 extend into an inner opening 132 of an eccentric cam 134. The cam 134 is located within an eccentric bearing 136. The eccentric bearing 136 is typically fixed to the housing (not shown) of a theodolite or other device. The eccentric cam 134 is attached to an engage/disengage knob 138 that can be rotated by an operator.

As shown in FIG. 10a the spin axis 112 of the worm gear shaft 106 is offset from an axis of rotation 139 of the eccentric cam 134. As shown in FIG. 10b rotation of the eccentric cam 134 moves the worm gear 102 away from the friction gear 104 to a disengaged position.

Referring to FIG. 8, the mechanism 100 includes an outer tube 140 which has an opening 142 that allows the worm gear 102 to engage the friction gear 104. The tube 140 and shaft 106 are attached to an end cap 144. the end cap 144 extends into an opening 146 of an end bearing 148. The end cap 144 may have an outer bearing collar 150 which allows the cap 144 and attached shaft 106 to rotate relative to the bearing 148. The opening 142 typically has an axis of rotation 152 that is offset from he spin axis of the shaft 106 and which coincides with the cam rotational axis 139 so that the tube 140 and shaft 106 can pivot about the end bearing 148 when the cam 134 is rotated to the disengaged position.

The end of the shaft 106 and end cap 144 may have ball bearings 154 and 156, respectively. Ball bearing 156 may be coupled to a spring 158 which provides a biasing force for returning the worm shaft 106 and pin 116.

Referring to FIG. 7, the mechanism 100 may further have an antibacklash spring 160 that engages an anti-backlash cam 162 to bias the worm gear 102 into the friction gear 104. When the worm gear 102 is engaged with the friction gear 104 the spring 160 is pressed against a corner of the cam 162. Rotation of the eccentric cam 134 into the disengaged position also rotates the anti-backlash cam 162 so that the flat portion of the cam 162 is adjacent to the spring 160. In this position the spring 160 does not exert a biasing force on the worm gear 102.

Figure 11:
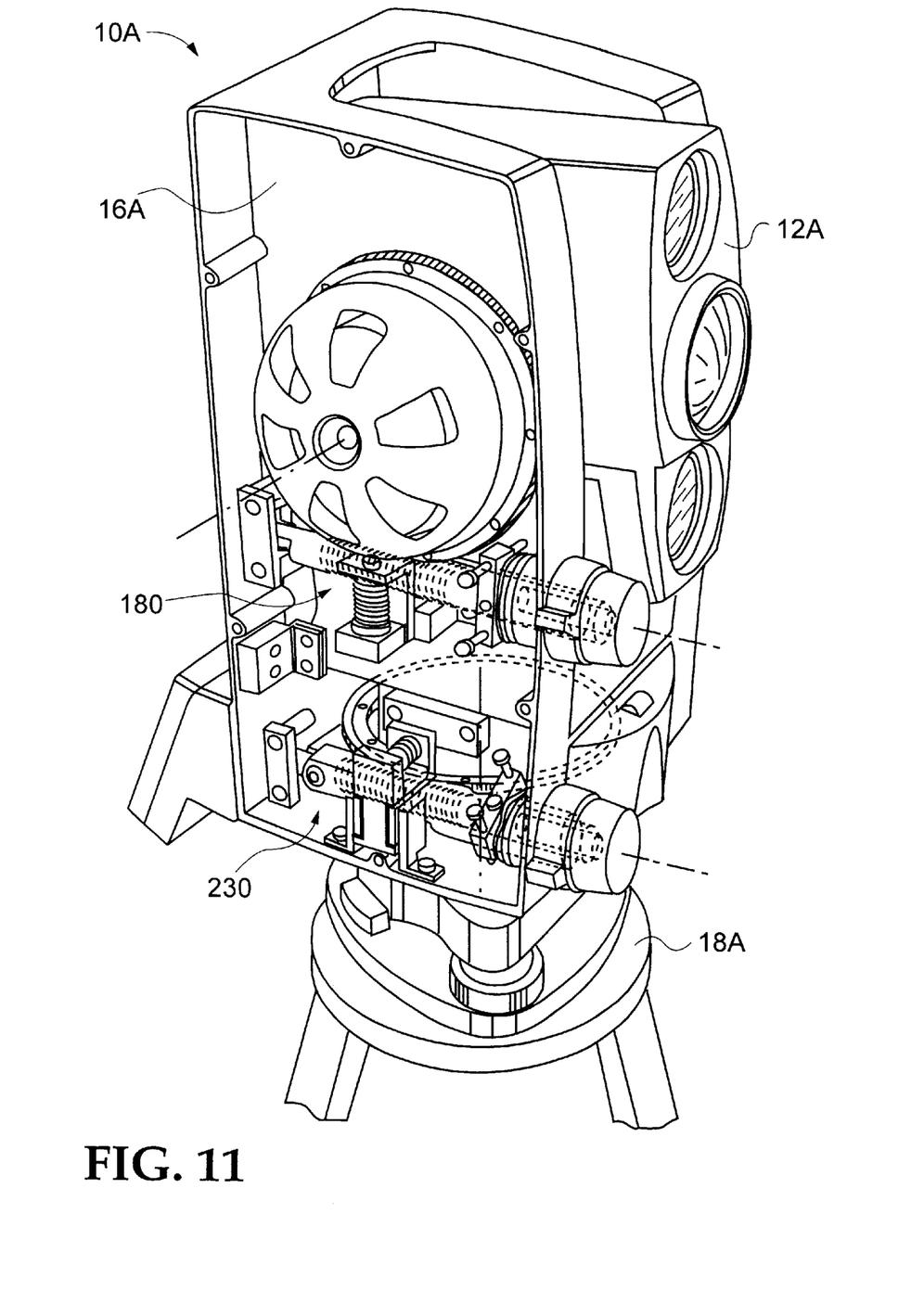
FIG. 11 is a perspective view of a theodolite according to another embodiment of the present invention.

FIG. 11 shows a theodolite 10A according to another embodiment of the present invention. The theodolite has a tripod stand 18A, an alidade base plate 16A mounted to the stand 18A, and a telescope 12A mounted to the base plate 16A. The base plate 16A is pivotal relative to the stand 18A in a horizontal sense and the telescope 12A is pivotal relative to the base plate 16A in a vertical sense.

The theodolite 10A further includes an adjustment mechanism 180 for adjusting the telescope 12A relative to the base plate 16A, and an adjustment mechanism 230 for adjusting the base plate 16A relative to the stand 18A.

Figure 11A:
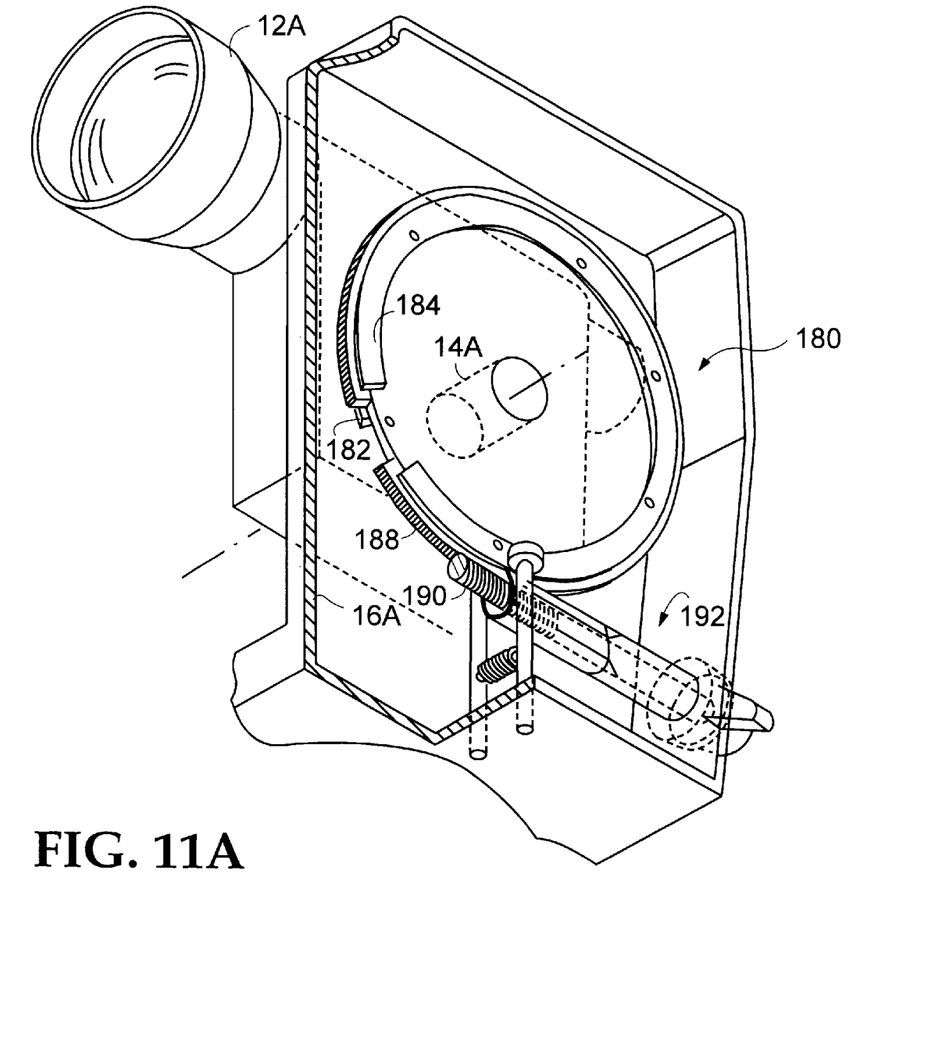
FIG. 11a is a perspective view of parts of the theodolite of FIG. 11.

FIG. 11A shows some of the components of the theodolite 10A in more detail. The adjustment mechanism 180 includes two clutch plates 182 and 184 mounted to a pivot pin 14A, a friction gear 188, a worm gear 190, and a clamping device 192. The pivot pin 14A is rotatable relative to the base plate 16A and the telescope 12A is secured to the pivot pin 14A. The friction gear 188 is coupled to and decoupled from the clutch plates 182 and 184 with a frictional force by means of the clamping device 192. By so coupling and decoupling the friction gear 188 minimum distortion of the telescope 12A occurs during coupling.

Figure 12A:
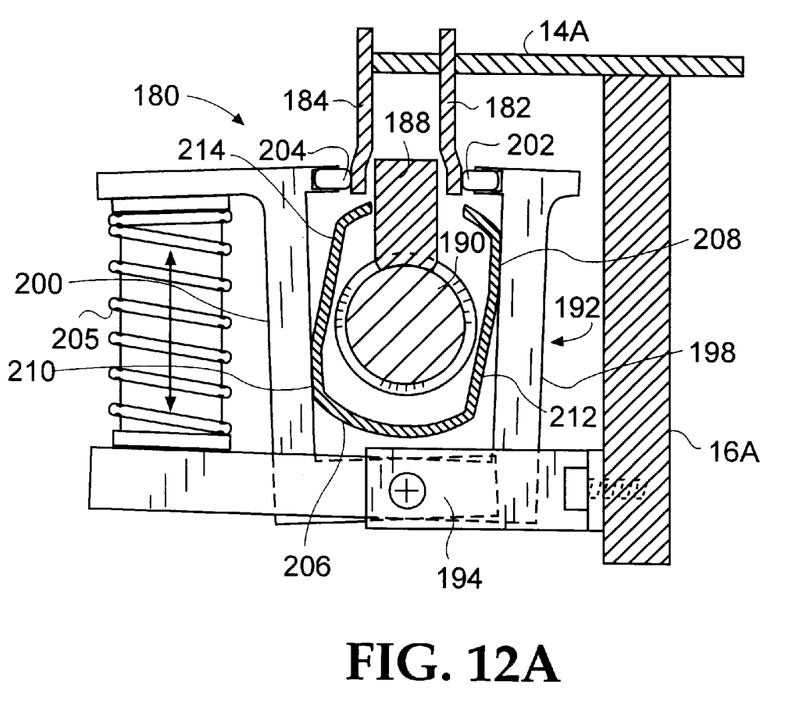
FIG. 12a is a sectional view of another alternate embodiment of an adjustment mechanism wherein a clutch disengages with a friction gear.
Figure 12B:
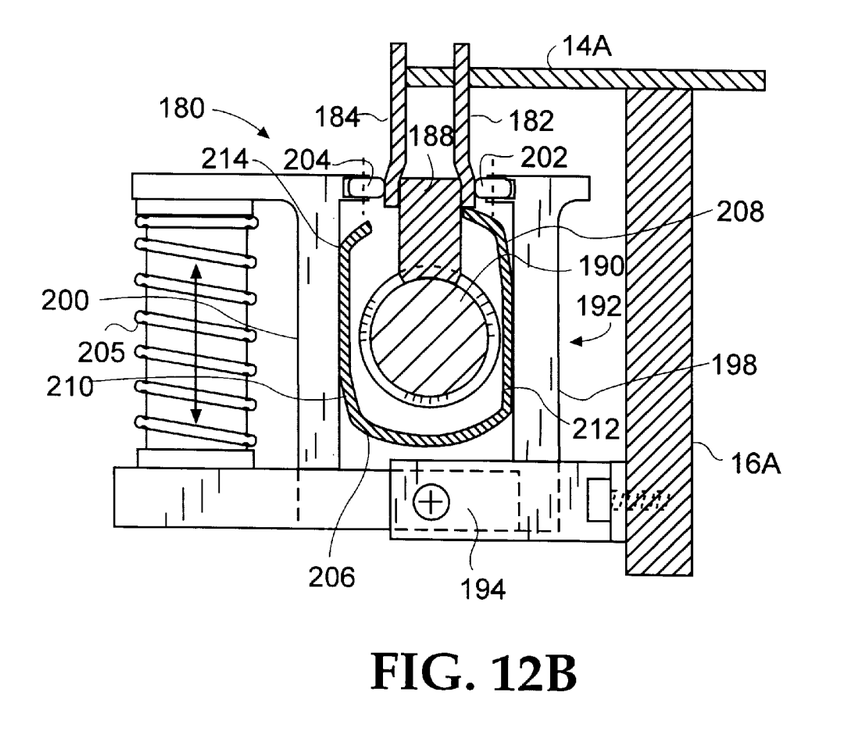
FIG. 12b is a view similar to FIG. 11a wherein the clutch is engaged with the friction gear.

FIGS. 12a and 12b show the adjustment mechanism 180 for adjusting the telescope 12A in more detail. The clutch plates 182 and 184 rotate together with the telescope 12A which is mounted to the pivot pin 14A. The clutch plates 182 and 184 are spaced from one another by a distance which increases slightly at outer edges of the clutch plates 182 and 184. The friction gear 188 is located between the clutch 182 and 184 and, as shown in FIG. 11a, rotates freely within the increased space at the outer edges of the clutch plates 182 and 184. The friction gear 188 is centered so that the friction gear 188 and the clutch plates 182 and 184 rotate about substantially the same axis.

The worm gear 190 is in constant mesh with the friction gear 188. Rotation of the worm gear 190 causes rotation of the friction gear 188. Since, in FIG. 11a, the friction gear 188 rotates freely between the clutch plates, rotation of the worm gear 190, and therefore the friction gear 188, is not translated to the clutch plates 182 and 184. An operator can therefore freely pivot the telescope 12A together with the pivot pin 14A and the clutch plates 182 and 184.

The clamping device 192 includes a support structure 194 secured to a the base plate 16A, two shafts 198 and 200 secured to the support structure 194, a wheel 202 and 204 on each shaft 198 and 200, respectively, and a rotatable sleeve 206 around the worm gear 190.

The wheels 202 and 204 are located on opposing sides of the clutch plates 182 and 184. The shafts 198 and 200 are pivotally mounted relative to one another and a spring 205 is mounted to bias the shafts 198 and 200 towards one another. The wheels thereby tend to clamp the friction gear 188 between the clutch plates 182 and 184 with a frictional force.

The rotatable sleeve 206 has an outer surface with a first set of opposing parallel flats 208 and 210 and a second set of opposing parallel flats 212 and 214. The flats 208 and 210 are further apart than the flats 212 and 214.

FIG. 12a shows the adjustment mechanism 180 with the rotatable sleeve 206 in a position with the first set of flats 208 and 210 pushing the shafts 198 and 200 apart so that the friction gear 188 is free to rotate relatively to the clutch plates 182 and 184. As mentioned previously, an operator may then freely adjust the telescope 12A without restriction by the worm gear 190.

FIG. 12b shows the adjustment mechanism 180 with the rotatable sleeve 206 rotated through about 300 so that the second set of flats 212 and 214 are in contact with the shafts 198 and 200. Since the second set of flats 212 and 214 are closer to one another than first set of flats 208 and 210, the wheels 202 and 204 are allowed to clamp the friction gear 188 between the clutch plates 182 and 184 under the spring force of the spring 205. The friction gear 188 is therefore coupled to the clutch plates 182 and 184 under frictional force.

Rotation of the worm gear 190, and therefore the friction gear 188, will now be taken up by the clutch plates 182 and 184 so that rotation of the worm gear 190 results in adjustment of the telescope 12A.

Because the wheels 202 and 204 roll on the clutch plates 182 and 184, rotation of the clutch plates 182 and 184 is not restricted by the adjustment mechanism 180.

During service the frictional force, with which the clutch plates 182 and 184 contact the friction gear 188, may be adjusted. The friction force may be adjusted by a device (not shown) which reduces or increases the force with which the spring 205 biases the shafts 198 and 200 towards one another.

The worm gear 190 and the rotatable sleeve 206 may be mounted to the stand in a manner similar to FIG. 1, and the worm gear 190 and the sleeves may be provided with knobs similar to the knobs 122 and 138 as shown in FIG. 7. An adjustment mechanism such as shown in FIG. 2 may also be incorporated for translational movement of the worm gear 190.

Figure 13:
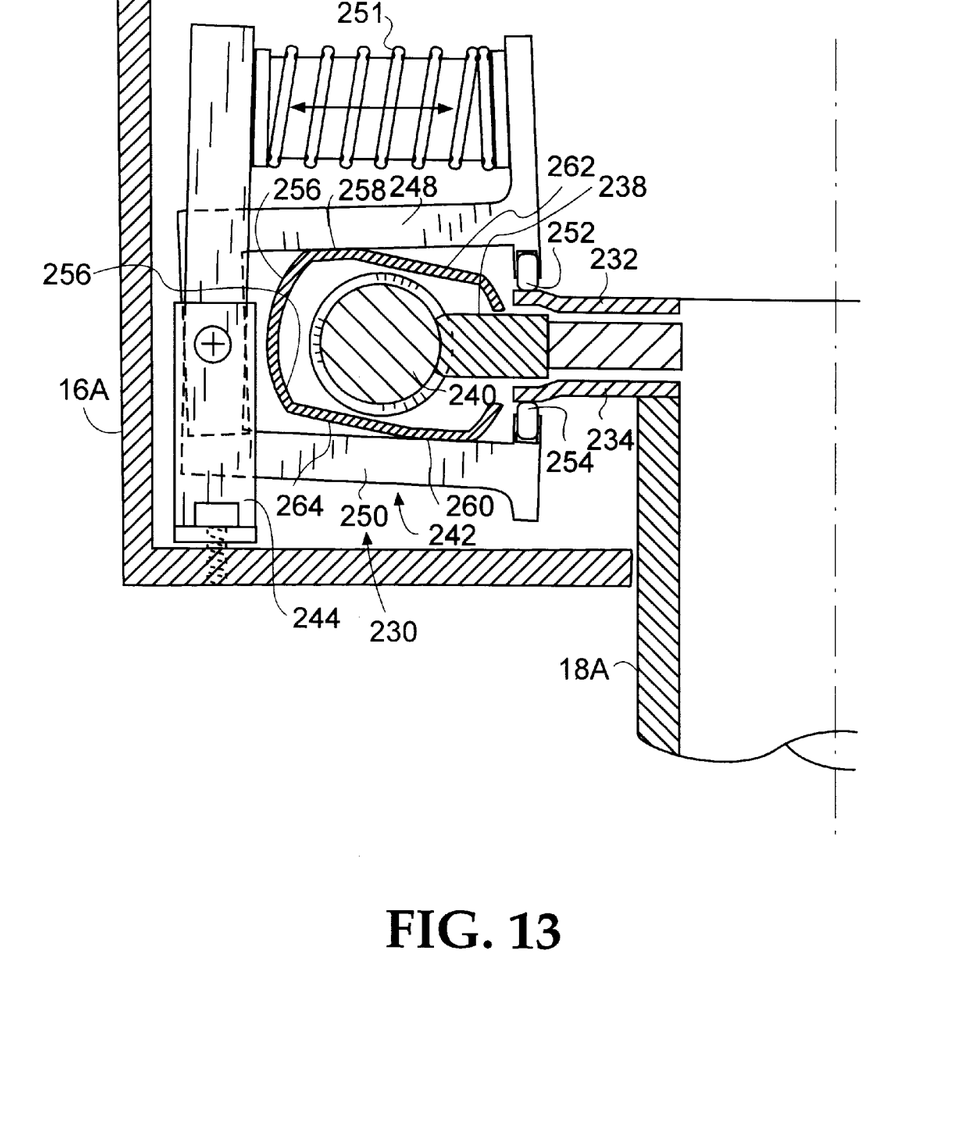
FIG. 13 is a sectional view of yet a further alternate embodiment of an adjustment mechanism.

FIG. 13 shows the adjustment mechanism 230 for adjusting the base plate 16A in more detail. The adjustment mechanism 230 includes two clutch plates 232 and 234 mounted directly to the stand 18A, a friction gear 238, a worm gear 240, and a clamping device 242.

The clamping device 240 includes a support structure 244 secured to the base plate 16A, two shafts 248 and 250 secured to the support structure 244, a wheel 252 and 254 on each shaft 248 and 250, respectively, and a rotatable sleeve 256 around the worm gear 240.

The worm gear 240 is mounted to the support structure 244 and is in constant mesh with the friction gear 238. The friction gear 238 therefore rotates together with the worm gear 240 upon rotation of the base plate 16A.

The shafts 248 and 250 are pivotal relative to one another and a spring 251 is mounted to bias the shafts 248 and 250 towards one another. The wheels thereby tend to clamp the friction gear 238 between the clutch plates 232 and 234.

The rotatable sleeve 256 has an outer surface with a first set of opposing parallel flats 258 and 260 and a second set of opposing parallel flats 262 and 264. The flats 258 and 260 are further apart than the flats 262 and 264.

FIG. 13 shows the adjustment mechanism 230 with the rotatable sleeve 256 in a position with the first set of flats 258 and 260 pushing the shafts 248 and 250 apart so that the friction gear 238 is free to rotate relatively to the clutch plates 232 and 234. An operator may then freely adjust the base plate 16A (together with the worm gear 240 and the friction gear 238) without restriction by the clutch plates 232 and 234 (being mounted to the stand 18A).

Once the sleeve 206 is rotated through about 30° the second set of flats 262 and 264 are in contact with the shafts 248 and 250. Since the second set of flats 262 and 264 are closer to one another than the first set of flats 258 and 260, the wheels 252 and 254 are allowed to clamp the friction gear 238 between the clutch plates 232 and 234 under the spring force of the spring 251. The friction gear 238 is therefore coupled to the clutch plates 232 and 234 under frictional force. The friction gear 238 is so prevented from movement relatively to the stand 18.

Rotation of the worm gear 240 will now cause the worm gear and the clamping device 242 to move along the gears on the friction gear 238. Since the clamping device 242 is mounted to the stand 18A, movement of the worm gear will cause rotation of the base plate 16A relative to the stand 18A.

Because the wheels 252 and 254 roll on the clutch plates 232 and 234, rotation of the clamping device 242 will not be restricted by the clutch plates 232 and 234.

During service the frictional force, with which the clutch plates 232 and 234 contact the friction gear 238, may be adjusted. The friction force may be adjusted by a device (not shown) which reduces or increases the force with which the spring 251 biases the shafts 248 and 250 towards one another.

A primary advantage of the embodiments shown in FIGS. 11, 12a, 12b and 13 over the embodiment shown in FIGS. 10a and 10b is that coupling between the telescope and its adjustment mechanism can be made without the need for moving teeth of gears into mesh and so distorting the positioning of the telescope. Coupling between a telescope and its adjustment mechanism by varying a frictional force which couples the telescope to a geared adjuster of the telescope therefore reduces distortion of the positioning of the telescope while coupling.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A theodolite which includes:
    a stand;
    a telescope which is secured for movement to the stand;
    a gear assembly that can move the telescope relatively to the stand; and
    a clutch plate that can couple and de-couple the gear assembly to and from the telescope.

2. The theodolite of claim 1 wherein the clutch plate is secured for at least limited rotational movement, wherein the gear assembly includes a friction gear which is mounted for rotation about substantially the same axis as rotation of the clutch plates and a worm gear which causes the friction gear to rotate, the theodolite further including a device which engages the friction gear with the clutch plate with a variable amount of frictional force.

3. The theodolite of claim 2 wherein the clutch plate rotates upon movement of the telescope.

4. The theodolite of claim 2 wherein the clutch plate is secured to the stand.

5. The theodolite of claim 2 wherein the device includes:
    a structure which is mounted to the stand; and
    a wheel which is secured to the structure and which is positioned to clamp the clutch plate and the friction gear against one another, the wheel being rotatable to allow for rotation of the clutch plate and the friction gear in unison; and
    an actuator which is operable to vary the amount with which the wheel clamps the clutch plate and the friction gear against one another.

6. The theodolite of claim 5 wherein the actuator includes:
    a member which is at least partially rotatable, the member having a surface which deflects the wheel upon rotation of the member.

7. The theodolite of claim 6 wherein the surface has at least first and second substantially flat surfaces, wherein the frictional force is different when the wheel is deflected by each surface.

8. The theodolite of claim 2 which includes:
    two clutch plates, wherein the friction gear is located between the clutch plates and wherein the device is a clamping device which clamps the friction gear between the clutch plates.

9. The theodolite of claim 2 wherein the worm gear is in constant mesh with the friction gear.

10. A theodolite which includes:
    a stand;
    a telescope which is secured to the stand for at least limited rotational movement;
    a clutch plate which is secured for at least limited rotational movement upon rotation of the telescope;
    a friction gear which is mounted for rotation about substantially the same axis as rotation of the clutch plate;
    a worm gear which is mounted to the stand and meshes with the friction gear so that rotation of the worm gear causes rotation of the friction gear; and
    a device which engages the friction gear with the clutch plate with a variable amount of frictional force.

11. A theodolite which includes:
    a stand;
    a telescope which is secured to the stand for at least limited rotational movement;
    a friction gear which is secured for at least limited rotational movement upon rotation of the telescope;
    a clutch plate which is secured to the stand;
    a worm gear which is mounted to the telescope and meshes with the friction gear so that rotation of the worm gear causes rotation of the friction gear; and
    a device which engages the friction gear with the clutch plate with a variable amount of frictional force.

12. A method of operating a telescope which includes the step of:
    varying a frictional force which couples the telescope with a geared adjuster for the telescope.

13. The method of claim 12 wherein the theodolite includes at least one clutch plate and a friction gear, wherein the frictional force couples the clutch plate with the friction gear.

14. The method of claim 13 wherein the theodolite includes two clutch plates on opposing sides of the friction gear, wherein the frictional force is adjusted by clamping the friction gear between the clutch plates.

* * * * *